(12) United States Patent
Lin

(10) Patent No.: US 9,546,861 B2
(45) Date of Patent: Jan. 17, 2017

(54) 3D LASER MEASURING SCANNING APPARATUS

(71) Applicant: Zhong Jian Lin, Ozone Park, NY (US)

(72) Inventor: Zhong Jian Lin, Ozone Park, NY (US)

( * ) Notice: Subject to any disclaimer, the term of this patent is extended or adjusted under 35 U.S.C. 154(b) by 0 days.

(21) Appl. No.: 14/963,949

(22) Filed: Dec. 9, 2015

(65) Prior Publication Data

US 2016/0187120 A1 Jun. 30, 2016

Related U.S. Application Data

(63) Continuation-in-part of application No. 14/565,650, filed on Dec. 10, 2014, now Pat. No. 9,239,227.

(60) Provisional application No. 62/054,954, filed on Sep. 24, 2014.

(30) Foreign Application Priority Data

Dec. 10, 2014 (CN) .................... 2014 2 0779591 U

(51) Int. Cl.

| | |
|---|---|
| *G01B 11/00* | (2006.01) |
| *G01C 15/00* | (2006.01) |
| *G02B 5/12* | (2006.01) |
| *G01B 11/02* | (2006.01) |
| *G01S 17/08* | (2006.01) |
| *G01S 17/87* | (2006.01) |
| *G01S 17/88* | (2006.01) |

(Continued)

(52) U.S. Cl.
CPC .............. *G01B 11/02* (2013.01); *G01B 11/00* (2013.01); *G01B 11/026* (2013.01); *G01S 7/4813* (2013.01); *G01S 17/08* (2013.01); *G01S 17/87* (2013.01); *G01S 17/88* (2013.01); *G01S 7/4808* (2013.01); *G02B 5/12* (2013.01)

(58) Field of Classification Search
USPC .................................................. 356/600–640
See application file for complete search history.

(56) References Cited

U.S. PATENT DOCUMENTS

| | | |
|---|---|---|
| 3,897,637 A | 8/1975 | Genho |
| 5,067,013 A | 11/1991 | Lindholm et al. |

(Continued)

*Primary Examiner* — Tri Ton
*Assistant Examiner* — Jarreas C Underwood
(74) *Attorney, Agent, or Firm* — Troutman Sanders LLP

(57) ABSTRACT

The invention discloses a 3D laser measuring scanning apparatus. The apparatus comprises: a measurement scanning body; an -axial laser beam outlet and an X-axial reception lens arranged on a side wall of the measurement scanning body, and a Y-axial laser beam outlet and a Y-axial reception lens arranged on another side wall; a Z-axial laser beam outlet and a Z-axial reception lens arranged on the bottom of the measurement scanning body, wherein a groove being open at the side wall with the X-axial laser beam outlet and at the side wall with the Y-axial laser beam outlet is formed in the bottom; a control device placed inside the measurement scanning body and for controlling the emitting of the laser beams from the laser beam outlets when receiving a measurement instruction through a measurement button on the measurement scanning body. A bar code and 2-dimensional bar code scanning laser head, a laser reception lens and a camera are also placed at the bottom of the measurement scanning body. By using this utility model, the three dimensions of a transport box can be easily measured.

13 Claims, 17 Drawing Sheets

(51) Int. Cl.
   *G01S 7/481*   (2006.01)
   *G01S 7/48*    (2006.01)

(56) References Cited

U.S. PATENT DOCUMENTS

| | | | | |
|---|---|---|---|---|
| 5,075,977 | A * | 12/1991 | Rando | G01B 3/00 |
| | | | | 33/227 |
| 5,387,969 | A | 2/1995 | Marantette | |
| 5,505,000 | A * | 4/1996 | Cooke | G01B 5/0002 |
| | | | | 33/286 |
| 5,589,981 | A | 12/1996 | Kasser et al. | |
| 5,841,535 | A * | 11/1998 | Aoki | G01S 17/08 |
| | | | | 356/493 |
| 6,154,319 | A | 11/2000 | Rando et al. | |
| 6,438,854 | B1 * | 8/2002 | Kott, Jr. | B25B 5/068 |
| | | | | 269/6 |
| 6,758,402 | B1 * | 7/2004 | Check | G02B 26/10 |
| | | | | 235/462.25 |
| 7,499,180 | B2 * | 3/2009 | Hattori | G03F 7/70775 |
| | | | | 356/510 |
| 8,266,807 | B2 | 9/2012 | Olsen | |
| 8,902,408 | B2 * | 12/2014 | Bridges | G01C 15/002 |
| | | | | 342/118 |
| 9,239,227 | B1 * | 1/2016 | Lin | G01B 11/002 |
| 2006/0283029 | A1 * | 12/2006 | Jan | G01C 15/002 |
| | | | | 33/286 |
| 2007/0153297 | A1 | 7/2007 | Lau | |

* cited by examiner

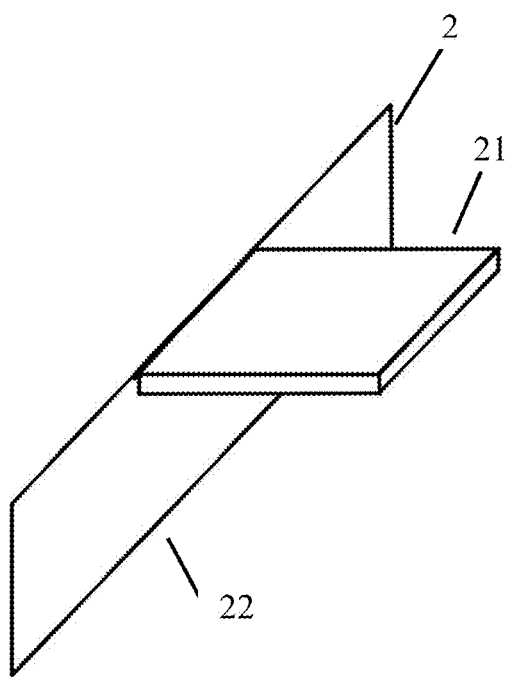 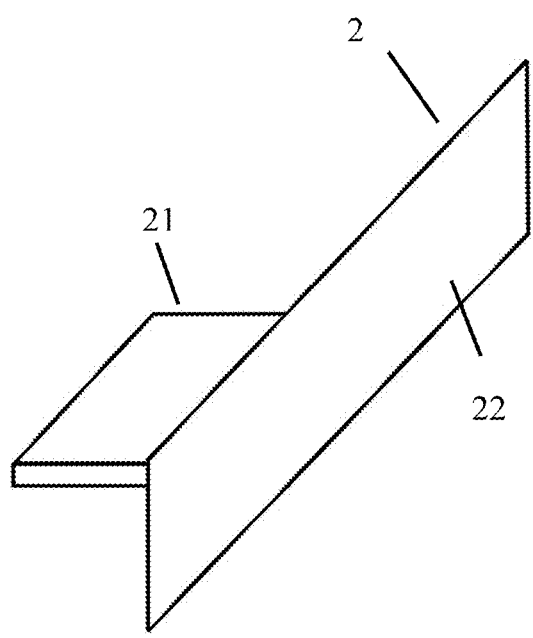
Fig.10a                    Fig.10b

US 9,546,861 B2

3D LASER MEASURING SCANNING APPARATUS

CROSS REFERENCE TO RELATED APPLICATIONS

The present application is a continuation-in-part of U.S. patent application Ser. No. 14/565,650, filed on Dec. 10, 2014, which claims priority to U.S. Provisional Patent Application Ser. No. 62/054,954, filed Sep. 24, 2014. The present application also claims priority to Chinese Patent Application Serial No. 201420779591.2, filed Dec. 10, 2014. The contents of the foregoing applications are hereby incorporated by reference in their entireties.

FIELD OF THE INVENTION

The present invention relates to the field of measurement scanning technology, more particularly, to a portable, multifunctional and movable 3D laser measuring scanning apparatus.

BACKGROUND OF THE INVENTION

In the course of cargo transportation, it is generally required to use a transport box for transporting cargos. When using conveyances to transport a large quantity of goods, it is critical to obtain the volume and weight of transport boxes in advance for the carriage. The existing measuring devices are generally large-scale devices, and it is required to place a transport box onto the bearing platform of the measuring device when measuring, causing waste of time and energy. Moreover, if the volume of the transport box is relatively large and the weight of the transport box is relatively heavy, measuring the three dimensions of the transport box would be much more inconvenient.

Therefore, a device is needed to scan the bar code or 2-dimensional bar code information on the commodity and measure the weight of the commodity, the volume of the transport box and other information at the same time.

SUMMARY OF THE INVENTION

With respect to the above-mentioned problem, the present invention provides a 3D laser measuring scanning apparatus, which can measure three dimensions of a transport box and can be easily operated.

A 3D laser measuring scanning apparatus in accordance with the present invention comprises:

a measurement scanning body;

an X-axial laser beam outlet and an X-axial reception lens arranged on a side wall of the measurement scanning body, and a Y-axial laser beam outlet and a Y-axial reception lens arranged on another side wall of the measurement scanning body;

a Z-axial laser beam outlet and a Z-axial reception lens arranged on the bottom of the measurement scanning body, and a groove being open at the side wall with the X-axial laser beam outlet and open at the side wall with the Y-axial laser beam outlet is formed in said bottom;

a control device placed inside the measurement scanning body and configured to control the emitting of the laser beams from the laser beam outlets when receiving a measurement instruction through a measurement button on the measurement scanning body;

a bar code and 2-dimensional bar code scanning laser head, laser reception lens and camera provided at the bottom of the measurement scanning body.

Optionally, the groove has a corner with a 90 degree angle structure.

Optionally, a sensor is arranged on a side wall of the groove. If the sensor gets into contact with the measured box, the control device makes control to emit the three laser beams including the X-axial laser beam, the Y-axial laser beam and the Z-axial laser beam.

Optionally, the scanning apparatus also comprises two laser reflecting corner plates, each laser reflecting corner plate includes a reflection plate and a mounting bracket, and the reflection plate can be a fixed angle iron shape reflect plate, or a two-side foldable reflect plate, or a one-side foldable reflect plate. The reflection plate is in a right angle status when being used, with a side being placed on the measured box and the other side extending a certain distance along the length direction of a mounting bracket. The laser beams emitted from the laser beam outlets are projected to the reflection plates and are reflected back to the respective reception lenses.

Optionally, the mounting bracket is provided with an angle iron shape.

Optionally, the measurement scanning body includes a magnet component, and the laser reflecting corner plates can be attached to the measurement scanning body if not used.

Optionally, the laser reflecting corner plate includes a mounting bracket and a reflection plate and the mounting bracket is heavier than the reflection plate.

Optionally, the apparatus includes a pair of gloves with rubber surface for reflecting laser.

Optionally, the measurement scanning body is configured to have a memory module for saving measurement data locally.

Optionally, the measurement scanning body is configured to have a wireless communication module used for wirelessly connecting with a label printer or a computer and transmitting the measurement data obtained by the measuring and the measurement data in the memory module to the label printer or the computer.

Optionally, a wireless electronic weighing scale is arranged on the measurement scanning body, and the electronic weighing scale is used to acquire the weight of a measured object on the wireless electronic weighing scale, and display it on the 3D laser measuring scanning apparatus.

Optionally, the control device is a control device configured to calculate the length, width and height of the measured box based on the round trip time of the laser beams and to further calculate the volume and/or the weight of the measured box.

Optionally, a display screen is arranged on the frontage of the measurement scanning body and is used for displaying the scanning length, width, height, volume or weight of the measured box, and the display screen is connected to the control device.

The 3D laser measuring scanning apparatus of the present invention makes it possible that only a click of one measurement button will allow to measure the three dimensions of the box simultaneously, and in the meanwhile, it can put the above-measured data into a management table by means of the bar code scan function, which is easy and efficient. When using the laser reflecting corner plates, the three dimensions of the box can be measured at any position, without the need of placing the box against a wall corner. When measuring the three dimensions of a transport box, there is no need to move the transport box and just placing the 3D laser measurer onto the transport box can obtain the three dimensions of the box. Compared to the existing measuring devices, it is easy and convenient, and furthermore is time-saving and energy-saving.

BRIEF DESCRIPTION OF THE DRAWINGS

FIG. 10a is a structure schematic diagram of fixed angle shape laser reflecting corner plate according to an embodiment of the present invention.

FIG. 10b an alternative view of the fixed angle shape laser reflecting corner plate as shown in FIG. 10a.

DETAILED DESCRIPTION OF PREFERRED EMBODIMENTS

The embodiments of the present invention will be detailed in the following in connection with the accompanying drawings.

Figure 1:
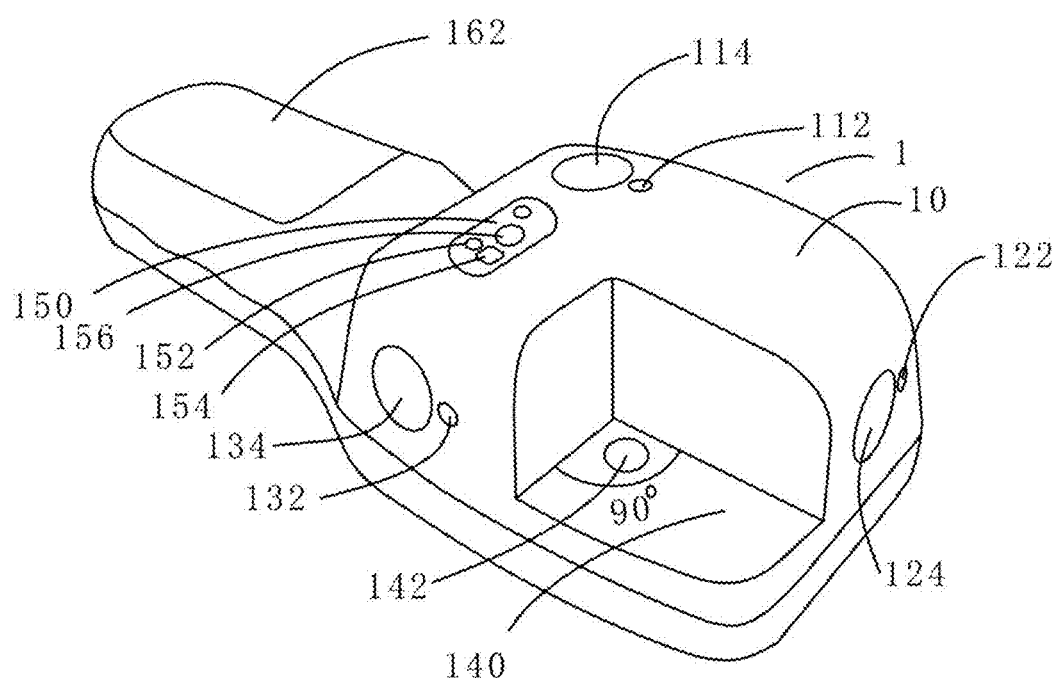
FIG. 1 is a perspective view of a 3D laser measuring scanning apparatus according to the embodiments of the present invention.
Figure 2:
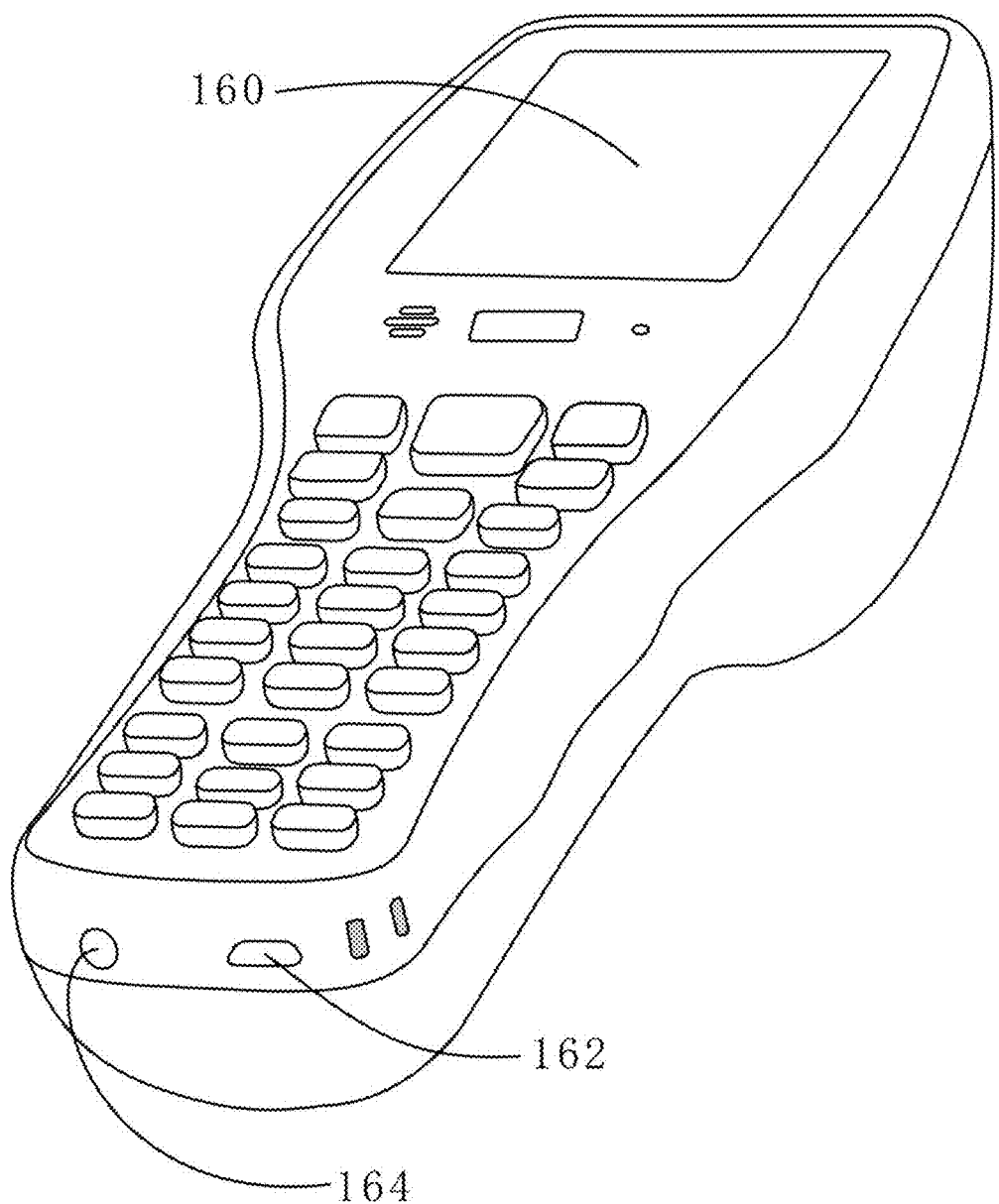
FIG. 2 is a perspective view of a 3D laser measuring scanning apparatus of FIG. 1 from an alternative angle.
Figure 3:
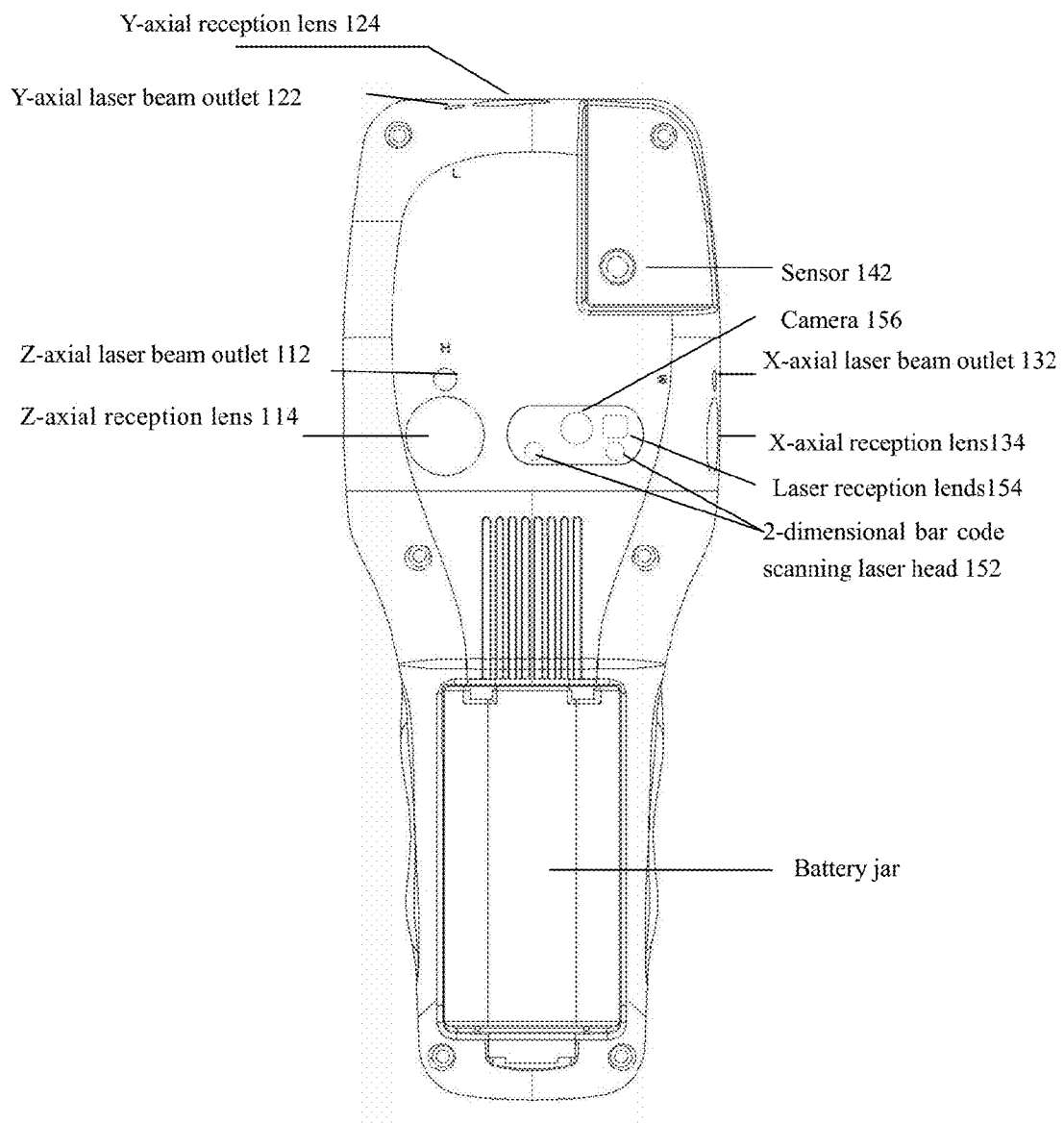
FIG. 3 is a plan view of a 3D laser measuring scanning apparatus observed from the back side.

FIG. 1 illustrates a perspective view of a 3D laser measuring scanning apparatus according to the embodiments of the present invention. FIG. 2 is a perspective view of the 3D laser measurer of FIG. 1 observed from a different point of view. FIG. 3 is a plan view of a 3D laser measuring scanning apparatus observed from the back side.

Referring to FIG. 1 to FIG. 3, the 3D laser measuring scanning apparatus 1 includes a measurement scanning body 10. A Z-axial laser beam outlet 112 and a Z-axial reception lens 114, which are used for measuring the height, are arranged on the bottom of the measurement scanning body 10. A Y-axial laser beam outlet 122 and a Y-axial reception lens 124, which are used for measuring the width, are arranged on one side wall of the measurement scanning body 10, and the X-axial laser beam outlet 132 and an X-axial reception lens 134, which are used for measuring the length, are arranged on the other side wall of the measurement scanning body 10. A groove 140 is formed at the bottom of the measurement scanning body 10 and the groove 140 is open at the side wall with the X-axial laser beam outlet and is open at the side wall with the Y-axial laser beam outlet.

The corners of the groove 140 are preferably formed with a 90 degree angle structure, and thus the 3D laser measuring scanning apparatus 1 can be easily fixed onto the corner of the box without having to precisely align the groove of the measurement scanning body to the corner of the box.

A sensor 142 is arranged on one side wall of the groove 140. When the 3D laser measuring scanning apparatus 1 is placed onto the measured transport box to proceed measuring, the all three laser beams will work if the sensor 142 gets into contact with the box. The 3D laser measuring scanning apparatus 1 will become a range measurer that activates only the Y-axial laser beam if the sensor 142 does not get into contact with the box.

A bar code and 2-dimensional bar code scanning laser head 152, a laser reception lens 154 and a camera 156 are arranged on the bottom of the measurement scanning body 10. By means of scanning bar code and 2-dimensional bar code, encapsulation box specification can be identified, cargo information can be recorded, inventory can be saved and customer order can be recorded. A display screen 160 and several other components are arranged on the frontage of the measurement scanning body 10. The display screen 160 can show the order number\invoice number, length, width, height, volume, weight and the of same size boxes for the measured boxes.

Figure 4:
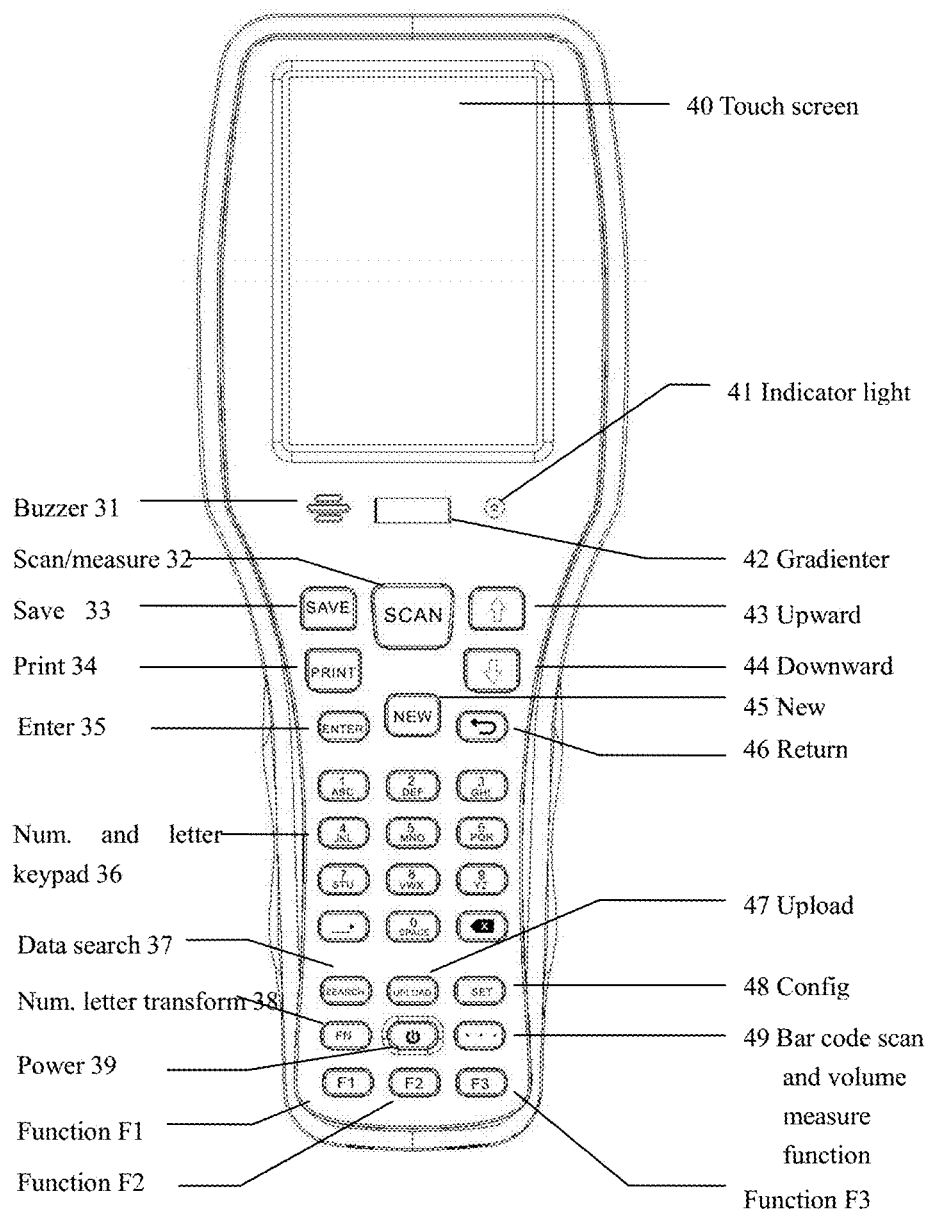
FIG. 4 is a front view of a 3D laser measuring scanning apparatus.

FIG. 4 illustrates the front view of the 3D laser measuring scanning apparatus. In an embodiment, the several components include buzzer 31, scan/measure key 32, save key 33, print key 34, enter key 35, number and letter keypad 36, data search key 37, number letter transform key 38, power key 39, touch screen 40, indicator light 41, gradienter 42, upward key 43, downward key 44, new key 45, return key 46, upload key 47, configuration key 48, bar code scan and 3D volume measure function switching key 49, function key F1, function key F2 and function key F3. Data cable ports 162 are also arranged on the measurement scanning body 10. A control device is arranged inside the measurement scanning body 10, and a plurality of buttons connect with the control device. The 3D laser measuring scanning apparatus further includes a wireless communication module, such as a Bluetooth module or a Wi-Fi module.

The control device implements the corresponding control operations according to the control instructions transmitted by the buttons. For example, under the click of the save button 33, if the 3D laser measuring scanning apparatus isn't connected to Wi-Fi, the measured data will be saved into memory cards, and if the 3D laser measuring scanning apparatus is connected to Wi-Fi, the measured data will be saved into memory cards and will be uploaded to computer simultaneously. As another example, when clicking print button 34, the control device will transmit the measured data (such as those displayed on the display screen 160) to printer for printing.

The measurement scanning body 10 can further include memory module (not shown), for saving the measured data into the scanning apparatus.

Specially, if the 3D laser measuring scanning apparatus isn't under wireless connection, the measured data will be saved into memory module, and then, if the scanning apparatus is under wireless connection, user can choose to upload the measurement data in the memory module to a label printer or a computer via wireless network.

The measuring scanning body 10 is further configured to have a wireless electronic weighing scale communication module, for wirelessly acquiring the weight of the measured object on the electronic weighing scale and for displaying the weight on the 3D laser measuring scanning apparatus.

The 3D laser measuring scanning apparatus enters 3D measurement mode as default when power on. Working modes can be changed via function key F1, function key F2, function key F3 and bar code scan and volume measure function key 49. Function F1 is used to save inventory, function F2 is used to record customer order, function F3 is used to record transmitting and receiving logistics. The functions above can be change into other functions via custom settings. All the measurement results can be integrated into logistics management table via the built-in software of 3D laser measuring scanning apparatus.

In this way, logistics personnel only need one 3D laser measuring scanning apparatus to complete multiple functions including scanning, measuring, statistics, synchronization and other tasks, which overwhelmingly simplifies the work flow of logistics and significantly improves work efficiency.

Figure 5:
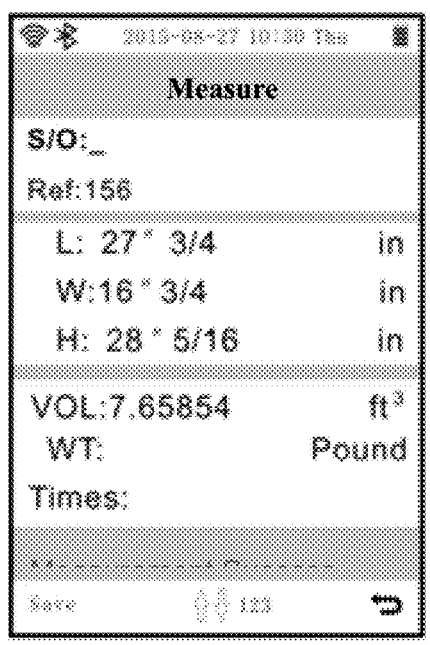
FIG. 5 is a schematic diagram of the measurement interface of a 3D laser measuring scanning apparatus.

FIG. 5 illustrates the measuring interface of 3D laser measurement scanning apparatus, which is a default interface after being powered on. The S/O stands for sales order number/invoice order number, and can also be changed into other name in custom settings. The multiple measured boxes of the same number will be renumbered with a postfix number like "–001". Ref stands for auto-generated continuous natural numbers, for identifying measured boxes. "L", "W" and "H", stand for the length, width and height of a measured box obtained by measuring, respectively. "VOL" stands for volume that is calculated with the measured length, width and height. "WT" stands for weight, which can be acquired from the formula provided by logistics company, or from the information provided by the electronic weighing scale via wireless transmission method. "Times" stands for the number of boxes of the same order number and the same size (i.e. measured boxes of the same order number and the same size). The number of the boxes can be input manually, and in this way, measuring time is saved, and measurement efficiency is improved.

Figure 6:
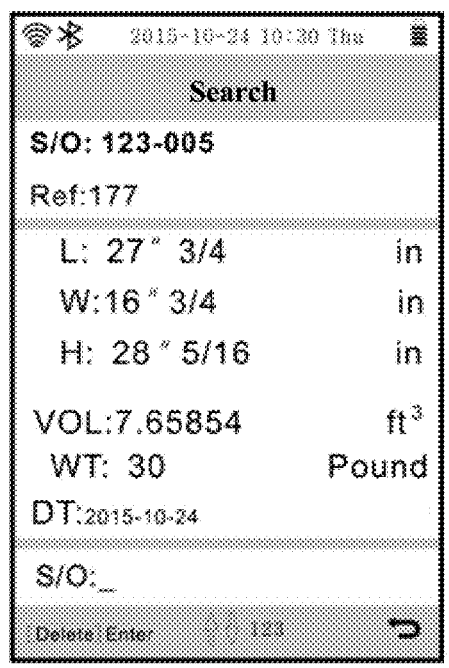
FIG. 6 is a schematic diagram of the search interface of a 3D laser measuring scanning apparatus.

FIG. 6 illustrates the search interface of 3D laser measurement scanning apparatus, and the interface appears when data search key is pressed. Items previously mentioned will be omitted. "DT" stands for date of the latest measurement. "S/O" below the "DT" stands for the sales order number or invoice order number to be input, and corresponding data information of the sales order number or invoice order number will be displayed when pressing the data search key after the input. "Delete" at left lower part allows users to delete the current order information by pressing enter key.

Figure 7:
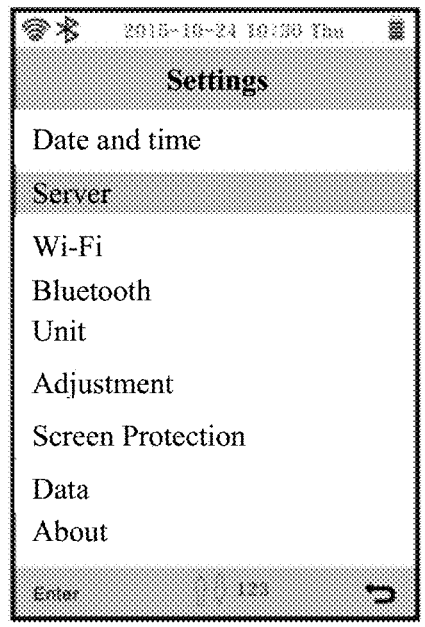
FIG. 7 is a schematic diagram of the configuration interface of a 3D laser measuring scanning apparatus.

FIG. 7 illustrates the setting interface of 3D laser measurement scanning apparatus, and the interface appears when setting key is pressed. "Date and Time" allows users to set date and time information. "Server" can be used to set IP address and UDP port. "Wi-Fi" can be used to search Wi-Fi signal and set up wireless connection. "Bluetooth" can be used to search device code of the printer or the electronic scale, and set up connection. After the scanning apparatus sets up connection of Wi-Fi and Bluetooth for one time, the wireless network information will be stored into the scanning apparatus. Next time, when the scanning apparatus starts up, it will automatically connect to the wireless network that has been connected. "Unit" can be used to choose British system or metric system. "Adjustment" can be used to adjust the accuracy of the laser beam. "Screen Protection" can be used to choose to call screen protection interface after standby for 5 minutes, 10 minutes, 20 minutes or 30 minutes. "Data" allows data delete operation. "About" includes version information, serial number, update information and so on.

Figure 8:
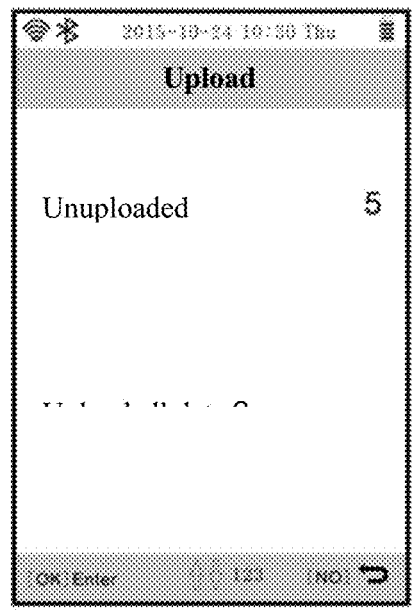
FIG. 8 is a schematic diagram of the upload interface of a 3D laser measuring scanning apparatus.

FIG. 8 illustrates unupload interface, and the interface appears when the upload key is pressed. "Unuploaded" stands for the number of the measurement data that have been save in this apparatus and that have not yet uploaded to the computer. When the enter key is pressed, the unuploaded data will be transmitted to the computer.

Figure 9:
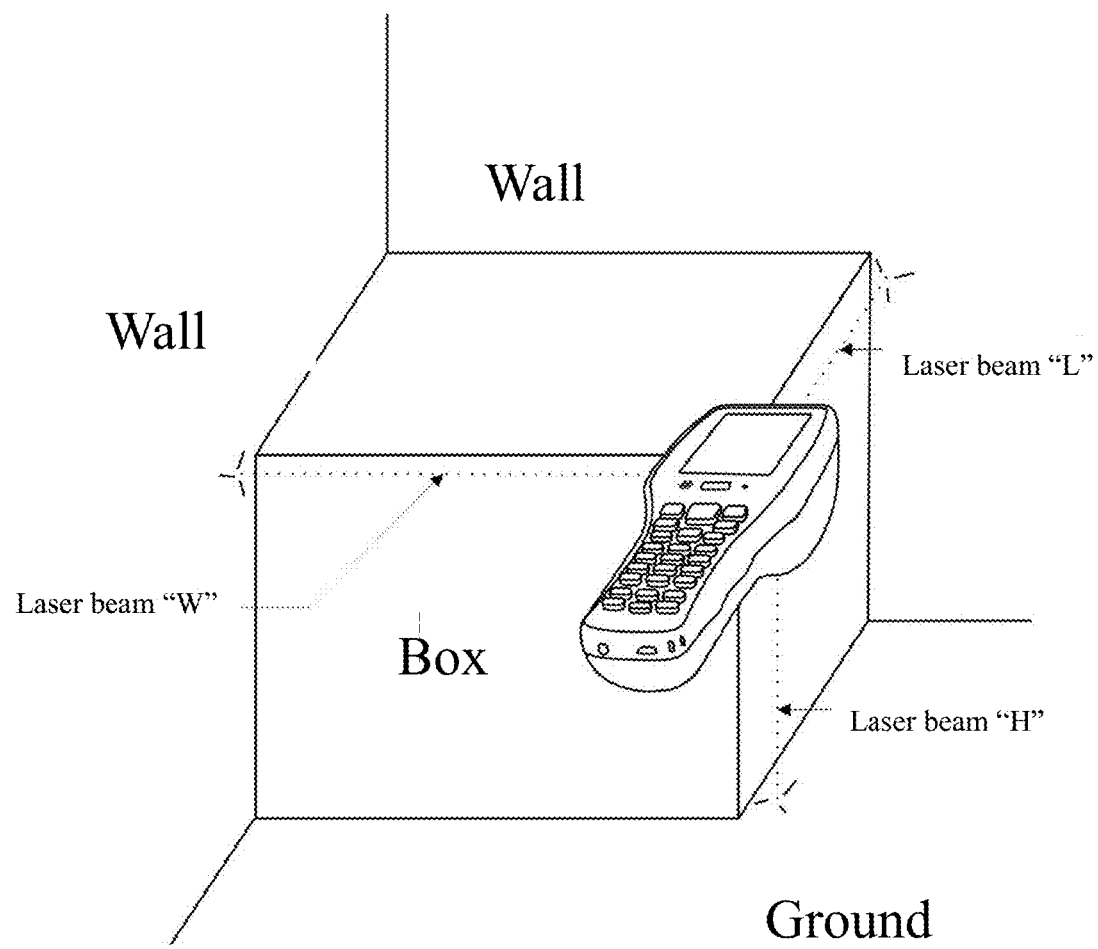
FIG. 9 is a schematic diagram of measuring a transport of a 3D laser measuring scanning apparatus.

FIG. 9 shows a schematic diagram of measuring a box by using the 3D laser measuring scanner As shown in FIG. 9, when measuring the box, the transport box shall be placed against a wall corner that is at a 90 degree angle and the laser measuring scanner is placed onto the corner of the transport box that is far away from the wall corner. Thus, the laser beams emitted from the X, Y, and Z axial laser beam outlets will be projected respectively along the length, width and height directions of the transport box, be reflected back to the measurer upon encountering the walls or the ground, and then be received by the X, Y and Z axial reception lenses. The control device can measure the length, width and height of the measured box based on the round trip time of the transmission of the laser beams.

The control device can further calculate the volume and/or weight of the box based on the measured length, width and height of the box. The weight of the box can be calculated based on the transportation company's formula or the data acquired from wireless electronic weighing scale, and the weight can also input manually if needed.

FIG. 10 illustrates schematic structure diagrams of the fixed type laser reflecting corner plates according to the embodiments of the present invention. As shown in FIG. 10*a* and FIG. 10*b,* the laser reflecting corner plate 2 includes a mounting bracket 21 and a reflection plate 23. The reflection plate 23 is fixed onto one end of the mounting bracket 21, and the other end of the mounting bracket 21 is fixed onto the measured box. In an embodiment, the mounting bracket 21 is provided with an angle iron shape.

Figure 11:
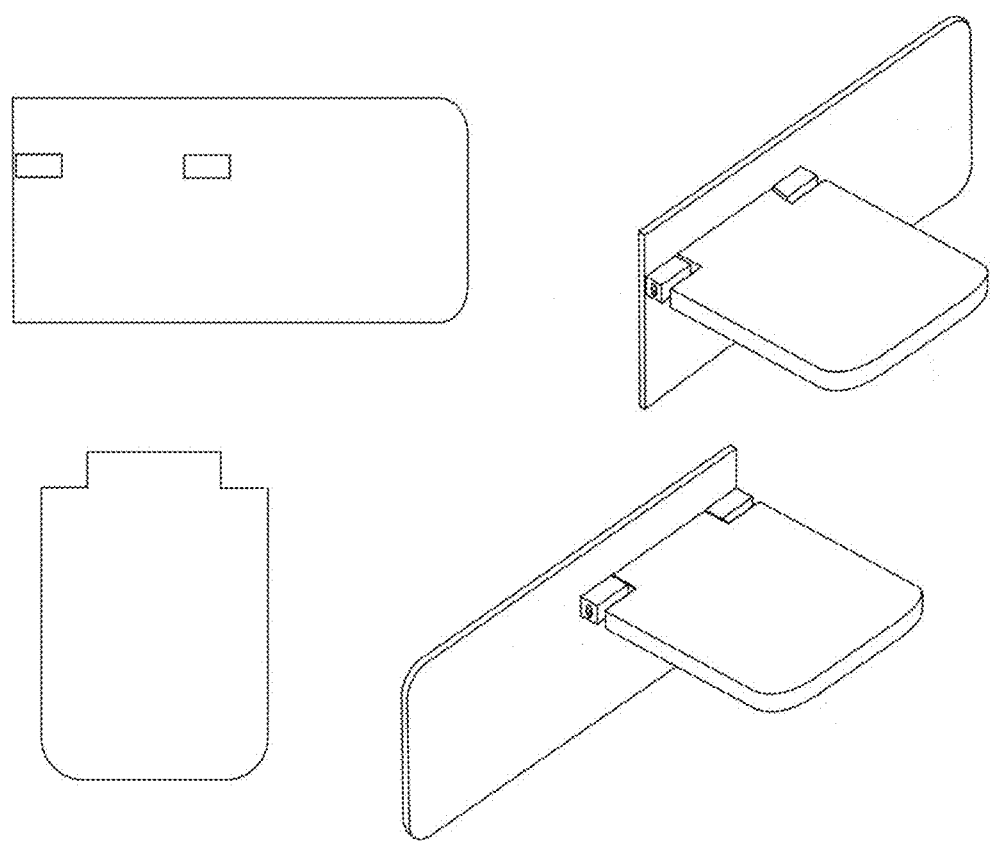
FIG. 11 is a structure schematic diagram of one-side foldable laser reflecting corner plate according to the embodiments of the present invention.
Figure 12:
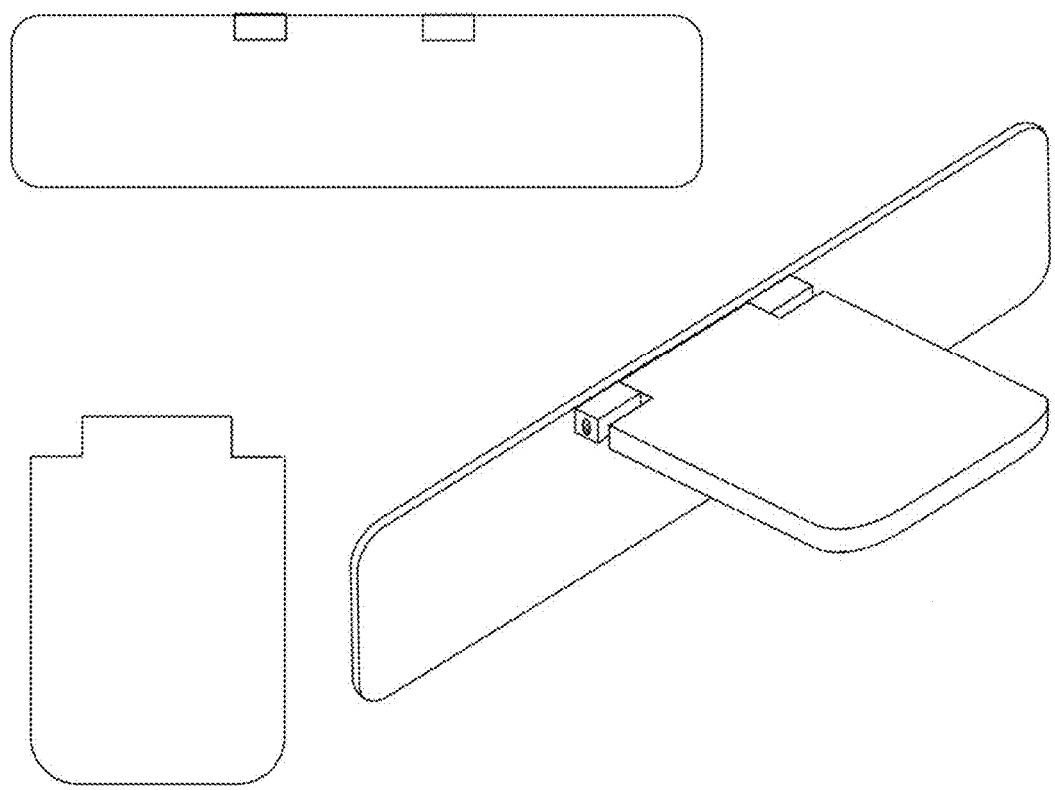
FIG. 12 is a structure schematic diagram of two-side foldable laser reflecting corner plate according to the embodiments of the present invention.
Figure 13:
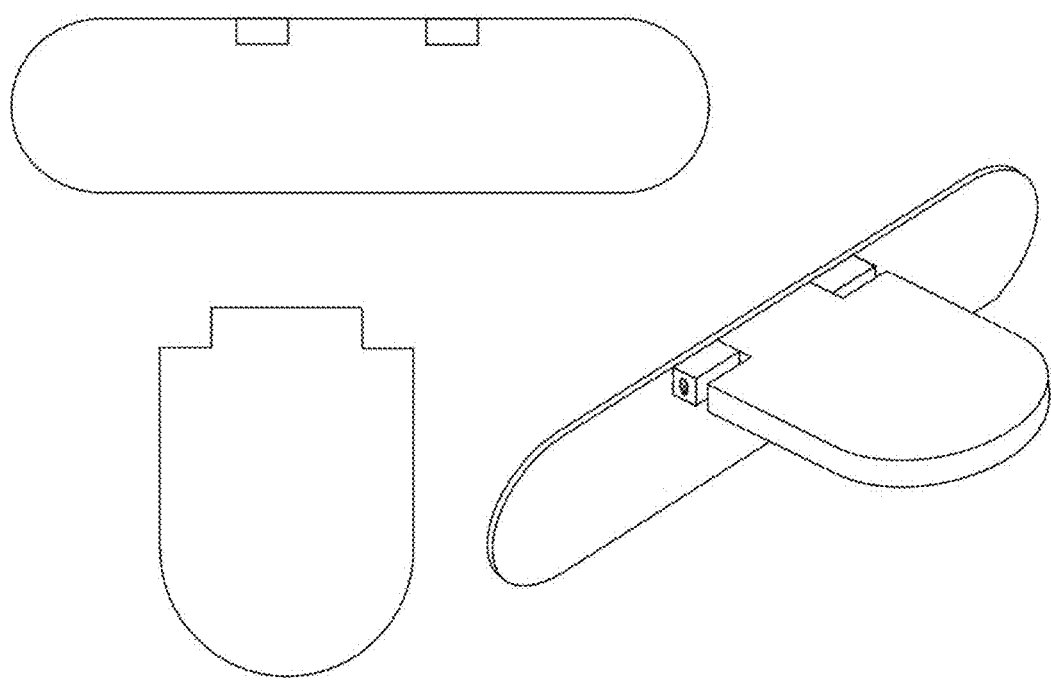
FIG. 13 is a structure schematic diagram of an alternative two-side foldable laser reflecting corner plate according to the embodiments of the present invention.

The laser reflecting corner plates may be a fixed angle shape reflecting plate, or a one-side foldable reflecting plate (as shown in FIG. 11) or two-side foldable reflecting plate (as shown in FIG. 12 and FIG. 13).

The mounting bracket 21 and the reflection plate 23 may be made of different materials. For example, the reflect plate 23 may be an aluminum alloy plate, plastic plate or wood plate, and the mounting bracket 21 may be a stainless steel plate. Furthermore, the stainless steel plate has a thickness thicker than a aluminum alloy plate. In this way, when the reflecting corner plate is placed on the corner of the box, the mounting bracket is heavier than the reflect plate, thereby preventing backfall.

Figure 14:
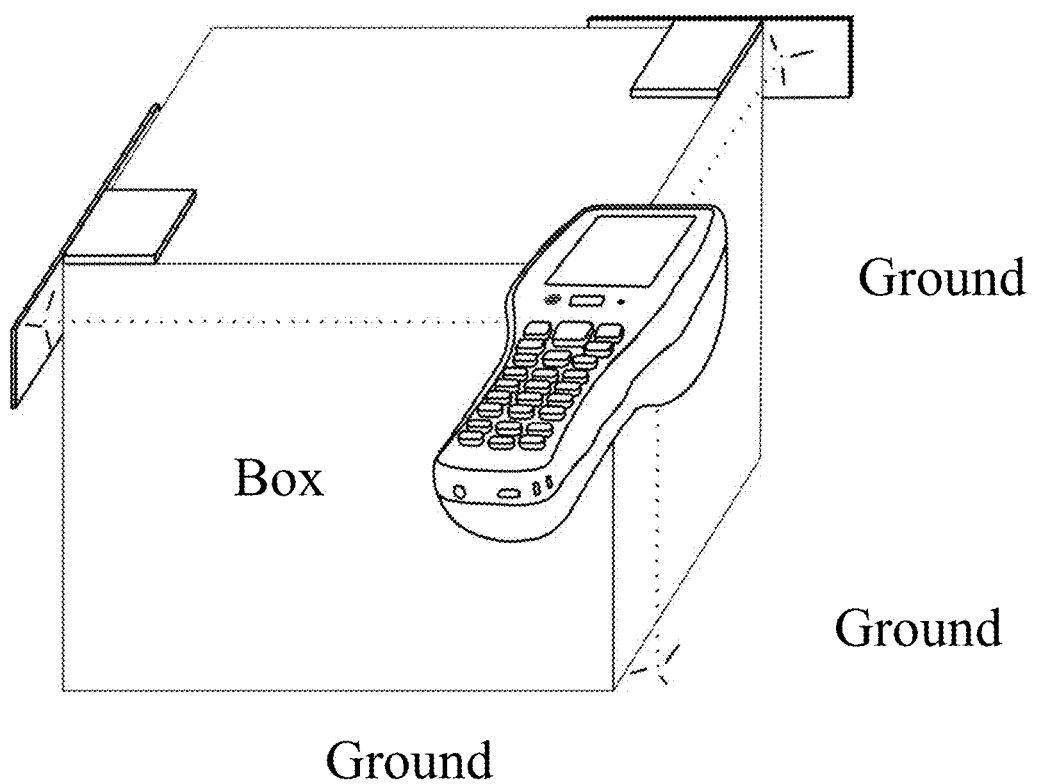
FIG. 14 is a schematic diagram of an embodiment measuring a box by using the 3D laser measuring scanning apparatus and two reflecting corner plates.

FIG. 14 shows a schematic diagram of measuring a box by using the 3D laser measuring scanning apparatus of this invention and two reflecting corner plates. As shown in FIG. 14, when being used, the two laser reflecting corner plates are fixed on the opposite angles of the box, respectively, each of the reflection plates extends a certain distance from the box body. The laser beams are projected to the reflection plates and then are returned back to the 3D laser measurement scanning apparatus to be received by the reception lenses.

Figure 15:
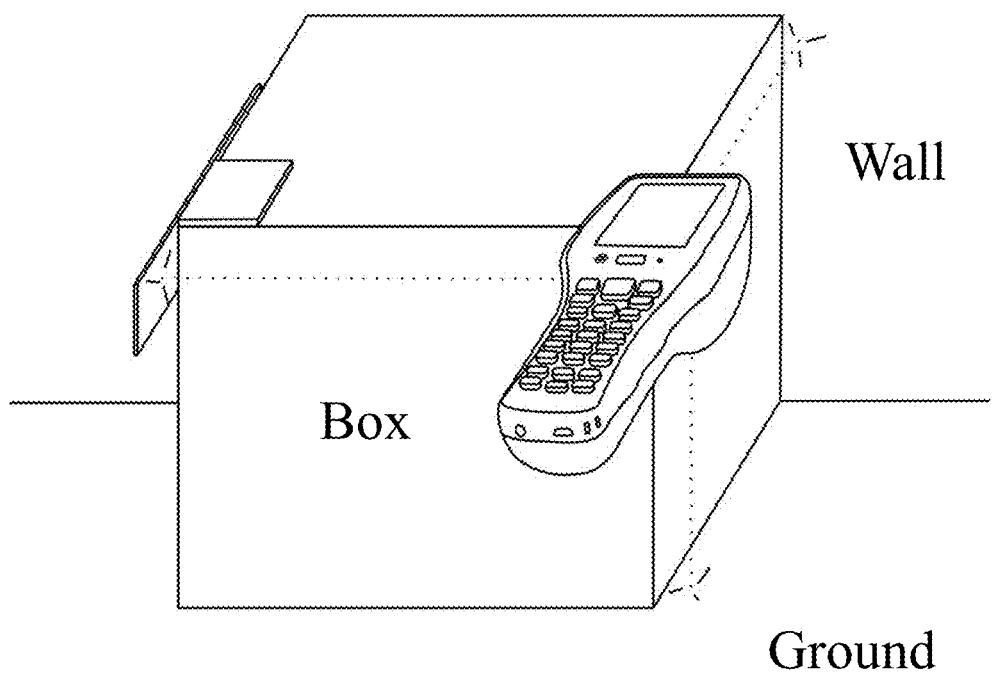
FIG. 15 is a schematic diagram of an embodiment measuring a box by using the 3D laser measuring scanning apparatus and a reflecting corner plate by means of the walls.
Figure 16:
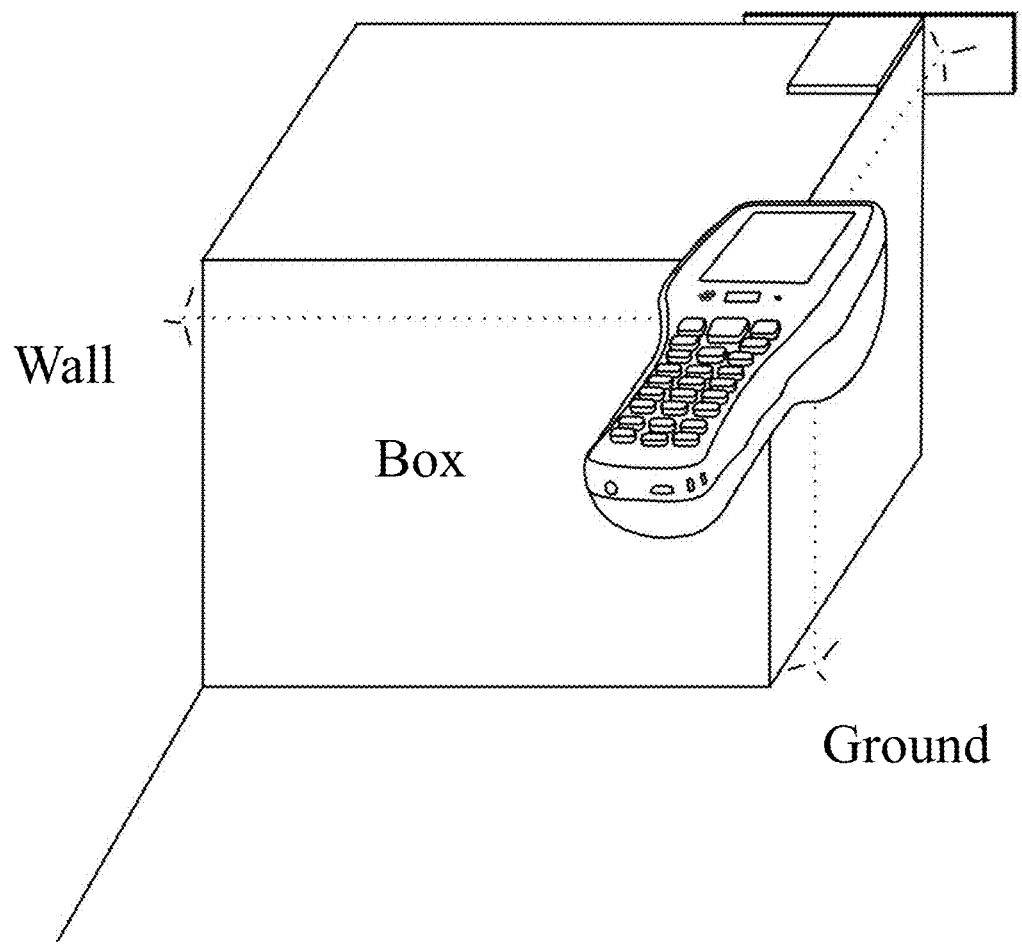
FIG. 16 is an schematic diagram of an alternative embodiment measuring a box by using the 3D laser measuring scanning apparatus and a reflecting corner plate by means of the walls.

FIG. 15 and FIG. 16 illustrate a situation of measuring a box by using only one reflecting corner plate by means of the walls. By using the method shown in the figure, measurement will be more simple and convenient.

The measurement scanning body 10 of the laser measurer 1 can further include a magnet component for attaching the laser reflecting corner plates 2 to the measurement scanning body 10 when being not used.

Figure 17:
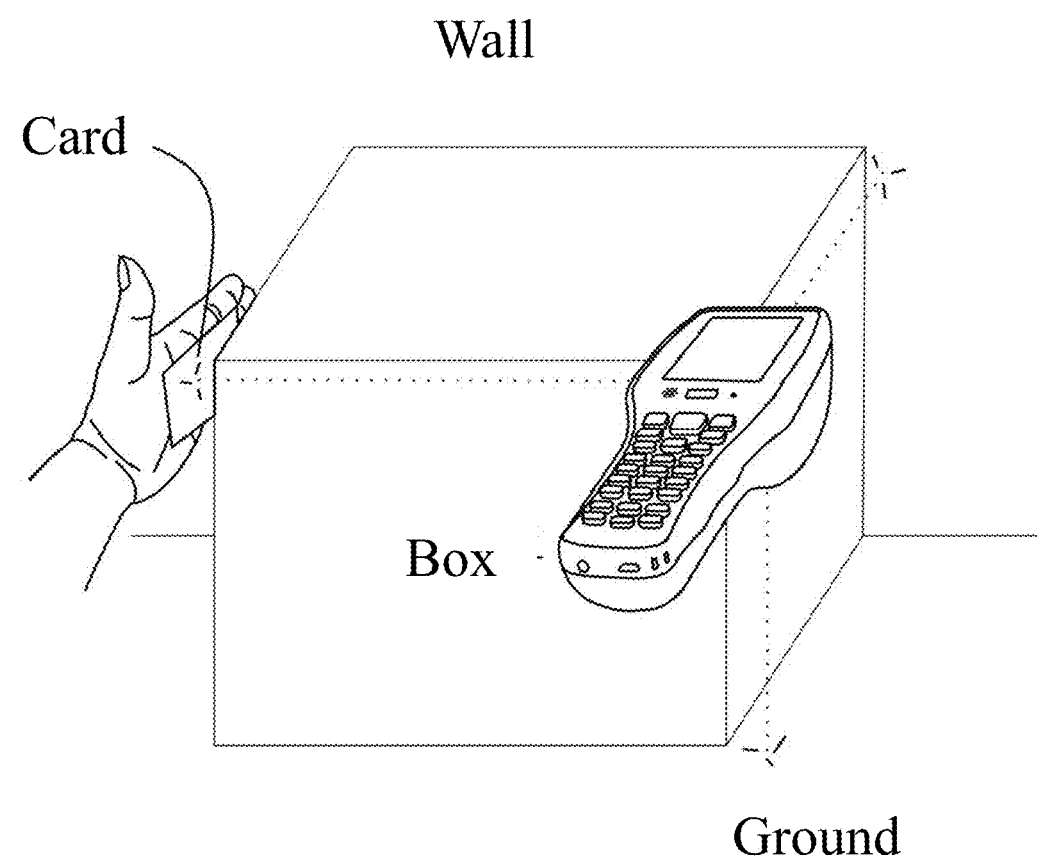
FIG. 17 is a schematic diagram of measuring a box by using the 3D laser measuring scanning apparatus and cards.

FIG. 17 is a schematic diagram of measuring a box by using the 3D laser measuring scanner and cards.

As shown in FIG. 17, a tint and light tight cards can be used to replace the laser reflecting corner plates.

When being used, the card is held by hand, making the card able to reflect laser and keeping parallel with the corresponding surface of the box as possible. Laser beam projects onto the card, returns to measuring scanning apparatus 1, and is received by reception lens.

Figure 18:
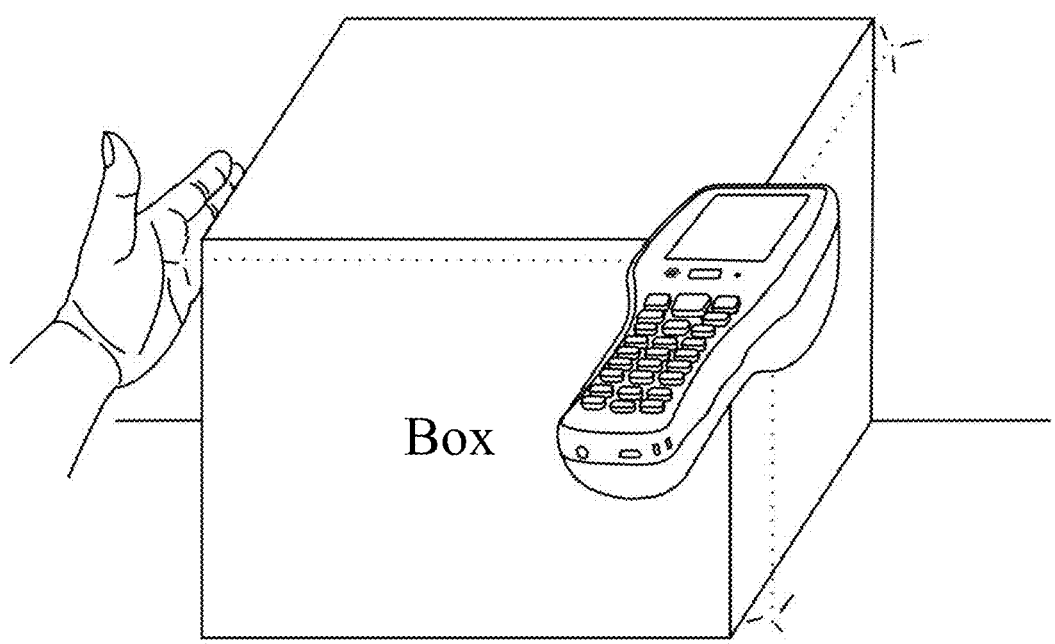
FIG. 18 is a schematic diagram of measuring a box by using the 3D laser measuring scanning apparatus and a hand.

FIG. 18 illustrates a schematic diagram of measuring a box by using the 3D laser measuring scanning and a hand. When being used, the hand is made to be able to reflect laser and to keep parallel with the corresponding surface of the box as possible. Laser beam projects onto the hand, returns to the 3D laser measuring scanner 1, and is received by reception lens.

Figure 19:
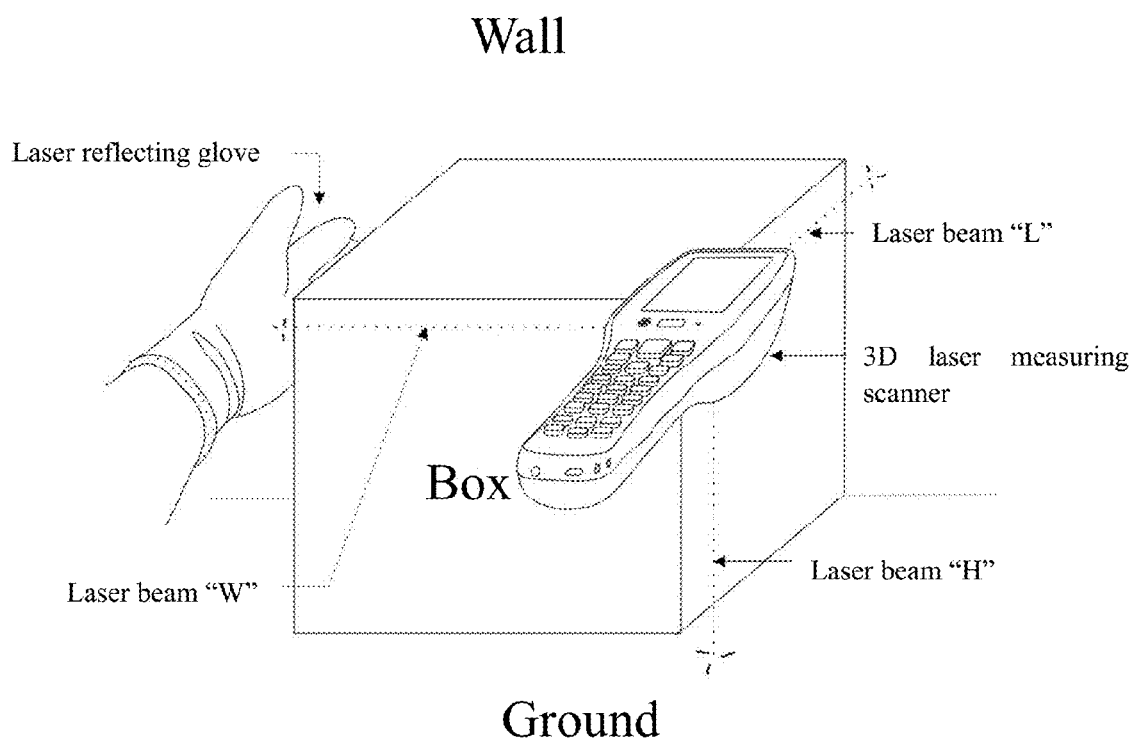
FIG. 19 is a schematic diagram of measuring a box by using the 3D laser measuring scanning apparatus and a laser reflecting glove.

FIG. 19 shows a schematic diagram of measuring a box by using the 3D laser measuring scanner and the laser reflecting glove. The 3D laser measuring scanner may include laser reflecting rubber gloves. The advantage of using the laser reflecting gloves over using hands directly is that, during operation process, the skin of hand may accumulate dust thus leading to poor effect of reflection of the surface of the hand. The laser reflecting gloves have a relatively good reflecting effect, are easy to wash and change, and are more convenient.

The 3D laser measuring scanner of the invention is able to measure the three dimensions information of a box simultaneously under just a click of the measure button, and it is easy and efficient. Moreover, it can scan the 2-dimensional bar code on the measured object, making cargo management more convenient.

While the present invention have a lot of different embodiments, the specification and the drawings have described only several possible embodiments of this invention. It will be understood, the disclosure shall be deemed to be a example of the principle of this invention, and the present invention shall not be limited to the scope of the illustrated embodiments. Various variants can be made to the embodiments by those skilled in the art without departing from the principle and spirit of the present invention. The scope of the present invention is only defined by the claims as attached and the equivalents thereof.

What is claimed is:

1. A 3D laser measuring scanning apparatus, comprising:
   a measurement scanning body (10);
   an X-axial laser beam outlet (132) and an X-axial reception lens (134) arranged on a side wall of the measurement scanning body (10), and a Y-axial laser beam outlet (122) and a Y-axial reception lens (124) arranged on another side wall;
   a Z-axial laser beam outlet (112) and a Z-axial reception lens (114) arranged on the bottom of the measurement scanning body (10), wherein a groove (140) being open at the side wall with the X-axial laser beam outlet and at the side wall with the Y-axial laser beam outlet is formed in said bottom and;
   a control device placed inside the measurement scanning body (10) and for controlling the laser beams emitted from the laser beam outlets when receiving a measurement instruction through a measurement button on the measurement scanning body (10);
   a bar code and 2-dimensional bar code scanning laser head(152), laser reception lens(154) and camera(156) provided at the bottom of the measurement scanning body (10).

2. The 3D laser measuring scanning apparatus according to claim 1, wherein the groove (140) has a corner with a 90 degree angle structure.

3. The 3D laser measuring scanning apparatus according to claim 1, wherein a sensor (142) is arranged on a side wall of the groove (140), and
   if the sensor (142) gets into contact with the measured box, the control device makes control to emit three laser beams including the X-axial laser beam, the Y-axial laser beam and the Z-axial laser beam.

4. The 3D laser measuring scanning apparatus according to claim 1, wherein the apparatus further includes two laser reflecting corner plates;
   wherein the laser reflecting corner plate includes a reflection plate (23) and a mounting bracket (21), and the reflect plate (23) is fixed on one end of the mounting bracket (21), and the other end of the mounting bracket (21) is placed onto the measured box;
   the reflection plate (23) is a fixed angle iron shape reflect plate, a two-side foldable reflect plate or a one-side foldable reflect plate;
   wherein the reflection plate is in a right angle status when being used, with a side being placed on the measured box and the other side extending a certain distance along the length direction of the mounting bracket; and
   wherein the laser beams emitted from the laser beam outlets are projected to the reflection plates and are reflected back to the respective reception lenses.

5. The 3D laser measuring scanning apparatus according to claim 4,
   wherein the mounting bracket (21) is provided with an angle iron shape; and/or,
   wherein the measurement scanning body (10) includes a magnet component capable of attaching the laser reflecting corner plates (2) to the measurement scanning body (10) if not being used.

6. The 3D laser measuring scanning apparatus according to claim 5, wherein the laser reflecting corner plate (2) includes a mounting bracket and a reflection plate and the mounting bracket is heavier than the reflection plate.

7. The 3D laser measuring scanning apparatus according to claim 1, wherein the apparatus further includes a pair of gloves with rubber surface for reflecting laser.

8. The 3D laser measuring scanning apparatus according to claim 1, wherein there are a plurality of buttons arranged on the frontage of the measurement scanning body, and the plurality of buttons are connected to the control device.

9. The 3D laser measuring scanning apparatus according to claim 1, wherein the measurement scanning body is configured to have a memory module for saving measurement data locally.

10. The 3D laser measuring scanning apparatus according to claim 9, wherein the measurement scanning body is configured to have a wireless communication module used for wirelessly connecting with a label printer or a computer and transmitting the measurement data obtained by the measuring and the measurement data in the memory module to the label printer or the computer.

11. The 3D laser measuring scanning apparatus according to claim 1, wherein a wireless electronic weighing scale is arranged on the measurement scanning body, and the electronic weighing scale is used to acquire the weight of a measured object on the wireless electronic weighing scale, and display it on the 3D laser measuring scanning apparatus.

12. The 3D laser measuring scanning apparatus according to claim 1, wherein the control device is a control device configured to calculate the length, width and height of the measured box based on the round trip time of the laser beams and to further calculate the volume and/or the weight of the box.

13. The 3D laser measuring scanning apparatus according to claim 12, wherein a display screen (160) is arranged on the frontage of the measurement scanning body, and the display screen is configured to display the sales order number, length, width, height, volume or weight of the measured box, and wherein the display screen (160) is connected to the control device.

* * * * *